Aug. 9, 1932.  G. RAUN  1,870,382

ELECTRICALLY OPERATED LAWN MOWER

Filed July 14, 1928    4 Sheets-Sheet 2

Inventor
George Raun
By Jesse R. Stone
Attorney

Aug. 9, 1932.    G. RAUN    1,870,382
ELECTRICALLY OPERATED LAWN MOWER
Filed July 14, 1928    4 Sheets-Sheet 3

Inventor
George Raun
By Jesse R. Stone
Attorney

Aug. 9, 1932.  G. RAUN  1,870,382
ELECTRICALLY OPERATED LAWN MOWER
Filed July 14, 1928  4 Sheets-Sheet 4
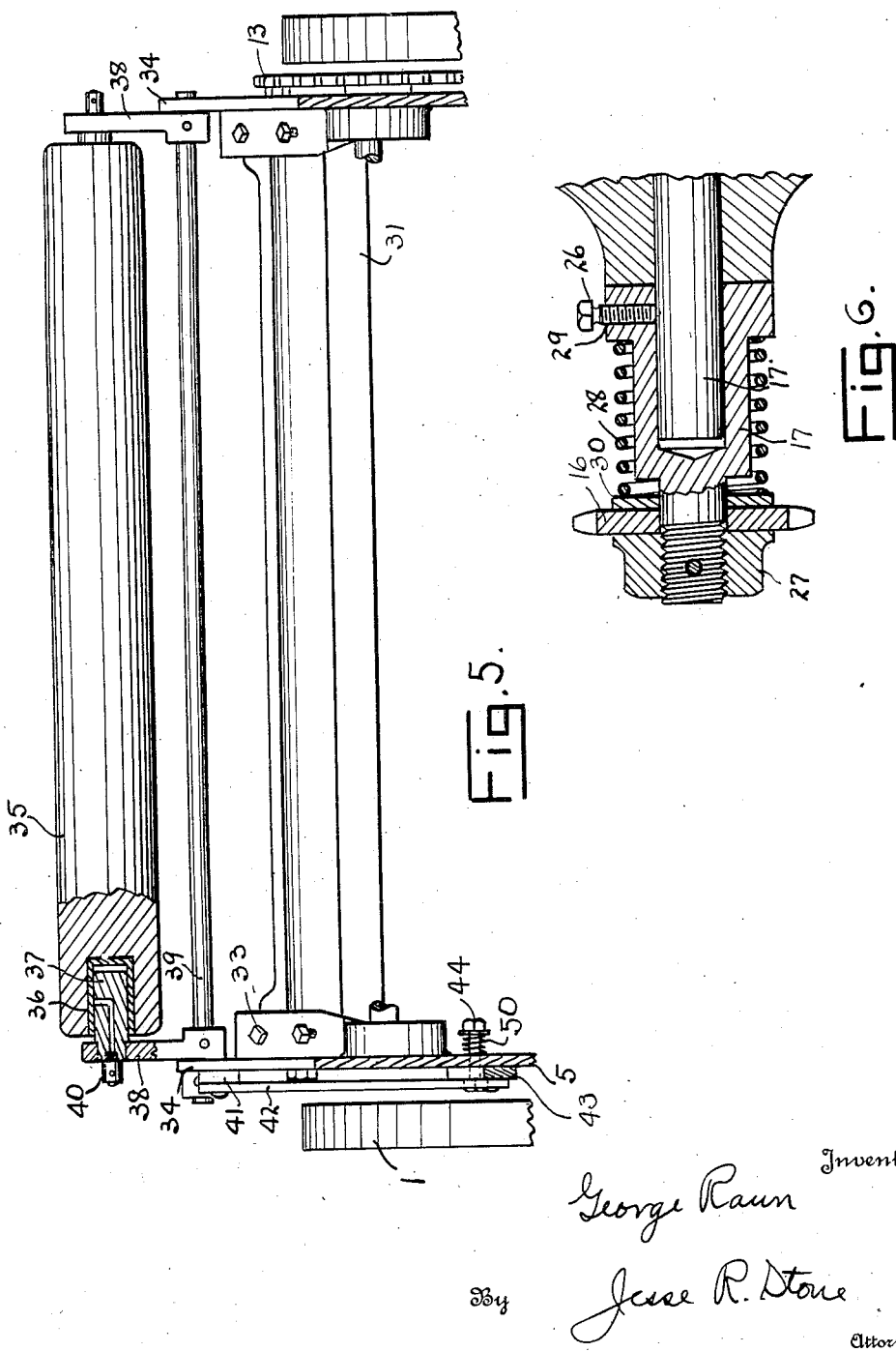

Patented Aug. 9, 1932

1,870,382

UNITED STATES PATENT OFFICE

GEORGE RAUN, OF EL CAMPO, TEXAS

ELECTRICALLY OPERATED LAWN MOWER

Application filed July 14, 1928. Serial No. 292,651.

My invention relates to motor operated lawn mowers of the rotary blade type.

In the ordinary power operated lawn mower it is customary to connect the motor directly with the supporting wheels of the mower in such manner that the operation of the motor will drive the traction wheels of the mower, and this drive will be communicated from the wheels to the shaft upon which the rotating blades are mounted. This means of propelling the mower has the disadvantage that the mower must be propelled forwardly at a rate of speed in proportion to the speed of the blades and does not permit the blades to be rotated rapidly while the mower is progressing slowly or standing still. This is a disadvantage for it is often desirable, especially when the grass is high, to propel the mower slowly while the blades are rotating rapidly.

This result has been accomplished in some types of mowers by mounting the blades upon the shaft connecting the wheels and allowing the wheels to be loosely connected with the shaft. This has some advantages over the old type, but is not entirely satisfactory for the reason that the height of the blades is fixed.

It is an object of my invention to provide a lawn mower in which the wheels are separately mounted upon a supporting shaft and the blades are mounted upon a different shaft supported in the frame of the mower, and in such manner that the rotating blades may be raised or lowered relative to the surface of the ground without difficulty and in which the blades are driven directly from the motor without connection with the traction wheels upon which the frame is supported.

It is also an object to provide means whereby the height of the blades may be easily regulated through the use of a single lever.

It is a further object to provide means connected with the motor to adjust the tension upon the drive chain with a minimum of difficulty.

Other objects and advantages reside in the particular construction and arrangement of the parts, as will be hereinafter set forth.

Referring to the drawings herewith, Fig. 1 is a front view of a lawn mower equipped with my invention, certain parts being in section to indicate the mounting of the frame upon the wheels.

Fig. 5 is a broken horizontal section taken on the plane 5—5 of Fig. 2.

Fig. 6 is a longitudinal section taken through the driving end of the motor shaft, showing the friction drive.

Figure 1:
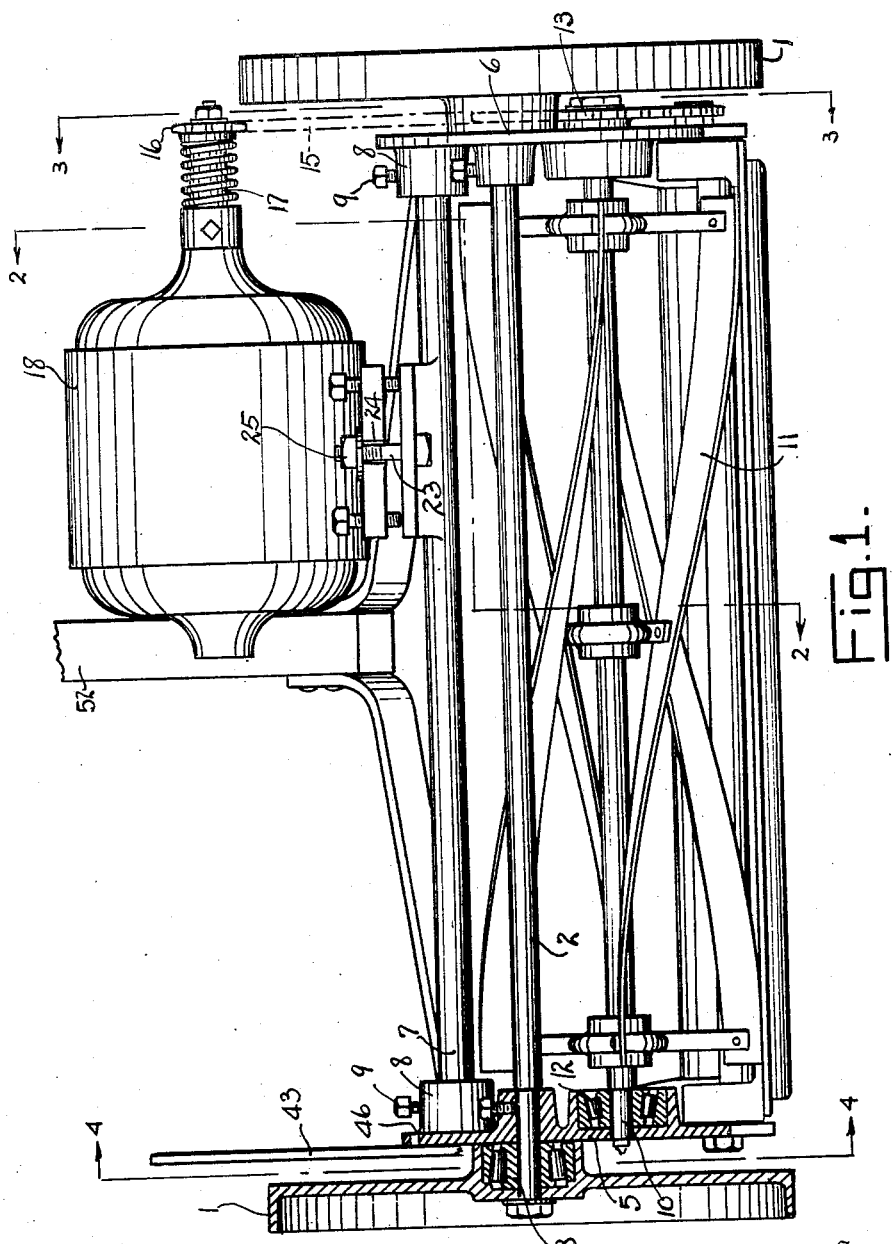

In the general construction of my lawn mower the main parts are similar to those of the usual commercial type of lawn mower. There are two traction wheels 1 mounted upon a shaft or axle 2. As will be seen from Fig. 1, the wheels have an anti-friction bearing 3 upon the axle and are freely rotatable relative thereto.

Supported upon the axle 2 is a frame including two end plates 5 and 6. These plates are connected together longitudinally of the frame by an upper shaft or rod 7 which is connected to the end plates through a bearing within hubs or bosses 8 in said plates and secured in position therein by set screws 9. Toward the lower and rearward side of the end plates 5 and 6 is mounted a shaft 10 on which the rotating blades 11 are fixed. The rotating blades and the shaft upon which they are mounted are not different from the usual rotating blades employed on lawn mowers and need not be further described. The shaft 10 is mounted in anti-friction bearings 12 at each end and the end adjacent the plate 6 is extended through the plate and has on the end thereof a sprocket wheel 13. Said wheel is positioned between the plate 6 and the traction wheel 1 and is adapted to be connected by means of a sprocket chain 15 to a sprocket wheel 16 on the outer end of the motor shaft 17.

The motor 18 may be an ordinary electric motor and I have mounted the same upon a base having laterally extending supporting legs 19. This base is supported upon a bracket 20 which is preferably formed integral with the shaft 7 previously referred to, as will be seen from Fig. 1. Said bracket has laterally extending plates 21 and furnishes a support for the base 19 of the motor. Cap screws 22 are extended downwardly through the plate 19 of the motor base to rest upon the bracket plate 21. There are four of these adjusting screws 22, two on each side of the motor, and, as will be noted, the height of the motor relative to the supporting bracket may be easily regulated by means of the justing screws 22. The motor is held firmly to the supporting bracket by means of bolts 23. There are two of these bolts, one at each side of the motor. They are extended upwardly through the arms 21 of the bracket and through slots 24 in the motor base and nuts 25 at the upper ends of said bolts are employed to clamp the motor base downwardly against the bracket. It will be obvious that this method of moving the motor allows the height of the motor to be varied to adjust the tension upon the drive chain and makes it possible to change this adjustment without difficulty.

The drive shaft 17 of the motor previously referred to is in fact an extension upon the motor shaft 17'. Referring to Fig. 6 it will be seen that the shaft 17' telescopes within the shaft extension 17 and is secured thereto by means of a set screw 26. The outer end of the extension is reduced in diameter and the sprocket wheel 16 is secured in position loosely upon said shaft by means of a nut 27. The sprocket wheel is held frictionally against the nut by means of a spring 28 bearing at its inner end against the base 29 of the shaft extension and at its outer end against a washer bearing frictionally against the inner side of the sprocket wheel. The force of this spring is sufficient to clamp the drive sprocket 16 between the washer 30 and the nut 27 so that the sprocket will rotate with the shaft and will be adapted to rotate therewith with a predetermined amount of resistance, but is adapted to slip between the nut and the washer when the blades are stopped abruptly through the engagement of sticks or of other foreign material between the rotating blades and the stationary blade.

The stationary blade 31 is mounted upon a plate 32 in the usual manner. This plate is slightly adjustable as to the angle in which it is placed by means of set screws 33. This is the usual adjustment. I have however another adjustment by means of which the frame including the stationary blade and the rotating blades may be adjusted relative to the surface of the ground. The end plates 5 and 6 are formed with a rearward extension 34 which furnishes an attachment for the ground roller 35. Said ground roller 35 can best be understood from Fig. 5. It may be a wooden roller having at each end a metal socket 36 to receive a bearing pin 37. Said pin is fixed within an arm 38 which is in turn fixed rigidly upon a transverse shaft 39 supported within the rearward extension 34 on each of the plates. The bearing for the roller 35 allows me to lubricate the roller by means of a grease gun and I have provided a nipple 40 to engage with the usual type of grease gun so that lubricant may be forced through a duct in the pin to the bearings 36.

The arms 38 supporting the ground roller may be varied as to position so as to regulate the height of the roller through the rotation of the shaft 39 upon which the supporting arms are fixed. This shaft may be rotated through an arm 41 fixed upon the end of said shaft and projecting upwardly at approximately right angles to said arms 38. The two arms 38 and 41 fixed to the shaft 39 form, in effect, a bell crank lever. The upper end of the lever arm 41 is connected pivotally to a link 42, which connects the lever arm 41 with an operating lever 43. Said lever 43 is pivoted upon a pin 44 mounted upon end plate 5 about centrally thereof and extends upwardly along the side of said plate 5, as will be seen from Fig. 1. The link 42 is connected pivotally to the lever by means of a pin 45 at a point spaced upwardly from the lower end of the lever.

The lever arm 43 may be latched in a plurality of adjusted positions by means of a pin 46 upon the said arm, said pin being adapted to project inwardly within any one of the series of openings 47 in the plate 5. The lever arm with the pin 46 thereon is held resiliently toward the plate so as to retain the pin in the desired opening 47 by means of a spring 50 mounted upon the pin 44 upon which the lever arm is fulcrumed. As will be seen from Fig. 5, the pin 44 extends through the plate 5 and the spring 50 tends to hold the said pin resiliently inward, but when it is desired to adjust the position of the ground roller the handle or lever 43 is moved outwardly away from the plate 5 to disengage the pin 46 from its opening 47. The spring 50 allows this outward movement and when the lever arm 43 is moved to engage the pin 46 in a different opening 47 the spring will tend to draw the arm and pin 46 into latched position and retain it latched.

Figure 2:
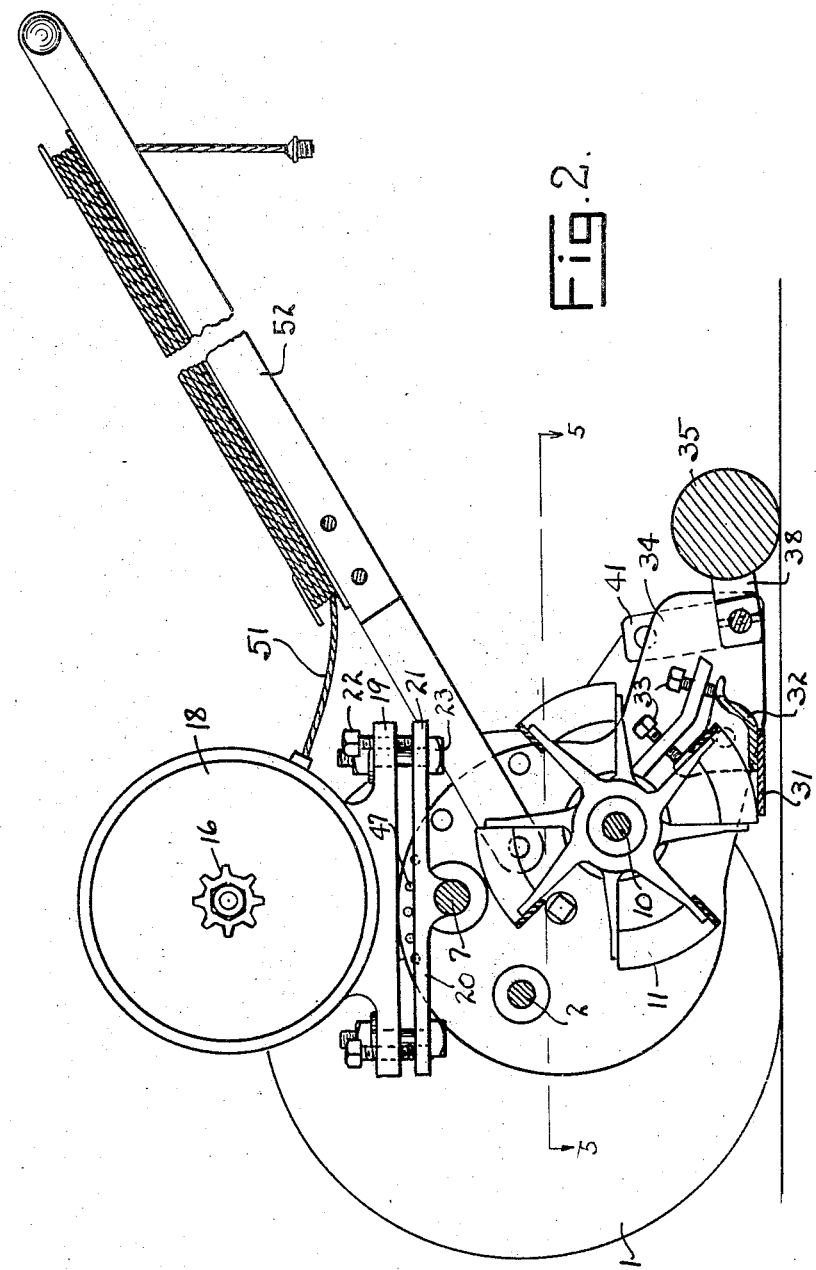
Fig. 2 is a side view taken in section along the plane 2—2 of Fig. 1.
Figure 3:
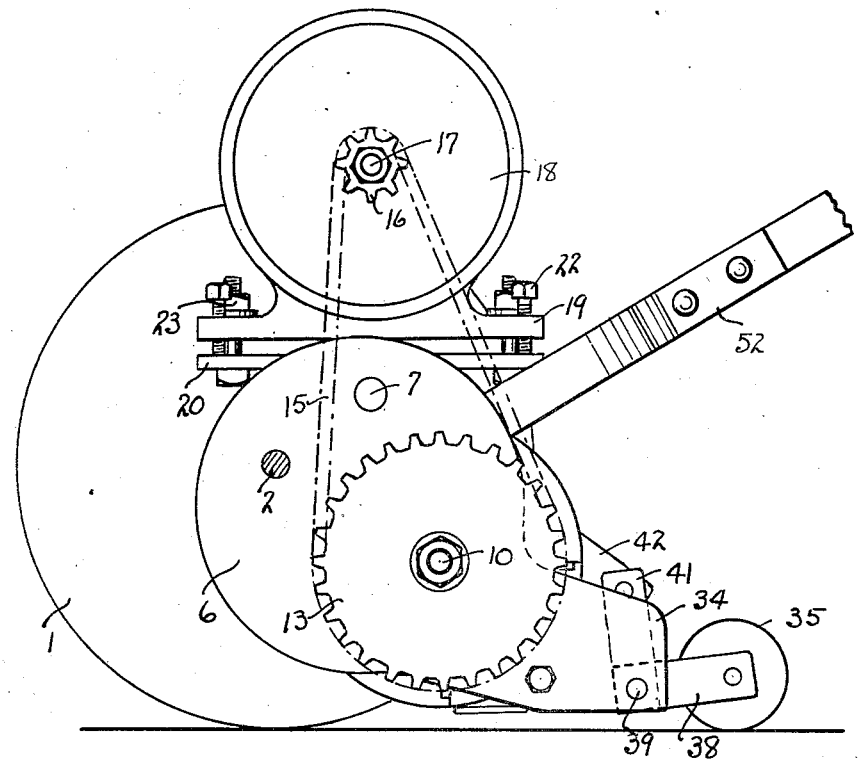
Fig. 3 is a side elevation partly in section on the plane 3—3 of Fig. 1.
Figure 4:
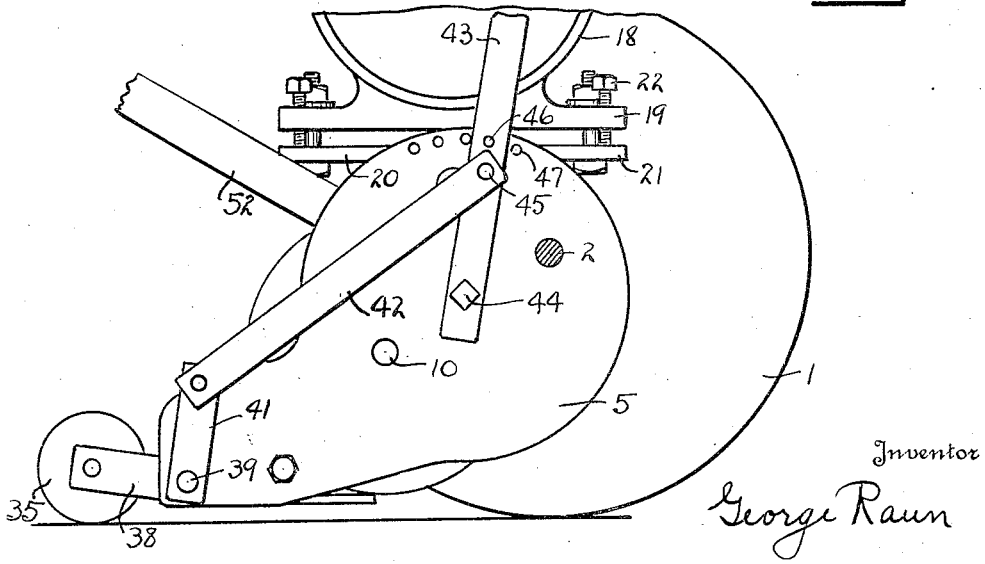
Fig. 4 is a broken side elevation taken on the plane 4—4 of Fig. 1.

In the operation of my device the motor is connected by means of a conductor 51 to any source of electric current and, as will be seen from Fig. 2, it is contemplated that sufficient electric cable may be wound upon the handle 52 of the mower to allow the mower to be moved about the desired area. The operator will move the mower from place to place by the usual method of pushing the mower along the ground and the anti-friction bearing upon the traction wheels 1 will allow it to be moved easily. The mower may be operated through the motor, the blades being driven at the desired rate of speed which permits the operator to go slowly where the grass is high or particular attention is to be given to any part of the lawn around bushes or borders, thus assuring that the lawn will be carefully cut. The fact that the mower may be driven at a rapid rate of speed whether it is being traversed along the ground or not enables the operator to cut the lawn in a much more satisfactory manner than with the old type of power operated machine. The further fact that with the blades separately driven the height of the blades relative to the ground may be readily adjusted in the usual manner is another advantage not obtained by previous types of mowers. The advantage of this construction will be appreciated by those skilled in the art.

What I claim as new and desire to protect by Letters Patent is:

1. In a lawn mower a frame, a pair of wheels supporting said frame, a rearward extension on said frame, a rod journalled in said extension, arms projecting rearwardly from said rod, a ground roller journalled on said arms, an upwardly extending arm on said rod, a lever pivoted on said frame, a link connecting said lever and said upwardly extending arm, a pin on said lever adapted to engage a plurality of openings in said frame, and means to hold said pin resiliently in one of said openings.

2. In a lawn mower, a cutter supporting frame, a pair of wheels supporting said frame, a ground roller, arms supporting said roller, a lever arm pivoted in said frame, operative connections between said lever arm and said roller supporting arms whereby they may be raised or lowered, a pin on said lever arm adapted to enage a plurality of openings in said frame and means to hold said lever arm resiliently toward said frame.

3. In a lawn mower, a cutter supporting frame, a pair of wheel supporting said frame, a ground roller, arms supporting said roller, a lever arm, a pivot pin for said lever arm in said frame, a spring on said pin holding said arm toward said frame, operative connections between said lever arm and said roller supporting arms whereby they may be raised or lowered, a pin on said lever arm adapted to engage a plurality of openings in said frame.

In testimony whereof I hereunto affix my signature this 6th day of July, A. D. 1928.

GEORGE RAUN.